United States Patent
Good

[15] 3,685,414
[45] Aug. 22, 1972

[54] SPRING-POWERED PRELOADED CAMERA

[72] Inventor: Paul J. Good, Springwater, N.Y.

[73] Assignee: Minnesota Mining and Manufacturing Company, Saint Paul, Minn.

[22] Filed: April 30, 1968

[21] Appl. No.: 725,297

[52] U.S. Cl............95/31 AC, 95/11 R, 95/31 FL, 95/31 CA
[51] Int. Cl........G03b 1/12, G03b 1/62, G03b 17/02
[58] Field of Search ....95/31 R, 11 R, 31 AC, 31 FL, 95/31 CA

[56] References Cited

UNITED STATES PATENTS

| | | | |
|---|---|---|---|
| 3,391,624 | 7/1968 | Brassington | 95/11 R |
| 3,427,942 | 2/1969 | Browning | 95/11 R |
| 631,222 | 8/1899 | Mason | 95/11 UW |
| 2,794,944 | 6/1957 | Laval | 95/31 UX |
| 2,917,981 | 12/1959 | Sewig | 95/31 X |
| 2,940,682 | 6/1960 | Steineck | 95/31 X |
| 3,132,574 | 5/1964 | Ernisse | 95/31 |
| 3,137,457 | 6/1964 | Beach | 95/31 X |
| 3,162,107 | 12/1964 | Byers | 95/11 |
| 3,384,318 | 5/1968 | Nerwin | 95/31 UX |
| 2,926,574 | 3/1960 | Bethmann | 95/31 |
| 2,933,027 | 4/1960 | Hollingworth | 95/31 |
| 3,036,507 | 5/1962 | Losseu | 95/31 |
| 3,247,773 | 4/1966 | Doblin | 95/31 |
| 3,406,621 | 10/1968 | Irwin | 95/31 |
| 3,412,662 | 11/1968 | Balalis | 95/11 |

Primary Examiner—Samuel S. Matthews
Assistant Examiner—Russell E. Adams, Jr.
Attorney—Kinney, Alexander, Sell, Steldt & Delahunt

[57] ABSTRACT

A camera preloaded with film and having a pretensioned spring drive means by which film is advanced through the camera. In one embodiment, the preloaded film is stored in a supply roll, stretched across the camera's picture-taking light path, and attached to a take-up spool; a pretensioned spring is coaxial with the take-up spool and biases the take-up spool toward film-advancing rotation; at least one stop is formed on the take-up spool; and a stop lever is normally in the path of the stop on the spool to hold the spool against film-advancing rotation, but the stop lever is pivotable out of the path of the stop by camera-actuating means to temporarily release the spool for film-advancing rotation.

13 Claims, 14 Drawing Figures

PATENTED AUG 22 1972

INVENTOR
PAUL J. GOOD

BY Kinney, Alexander,
Sell, Steldt & DeLaHunt
ATTORNEYS

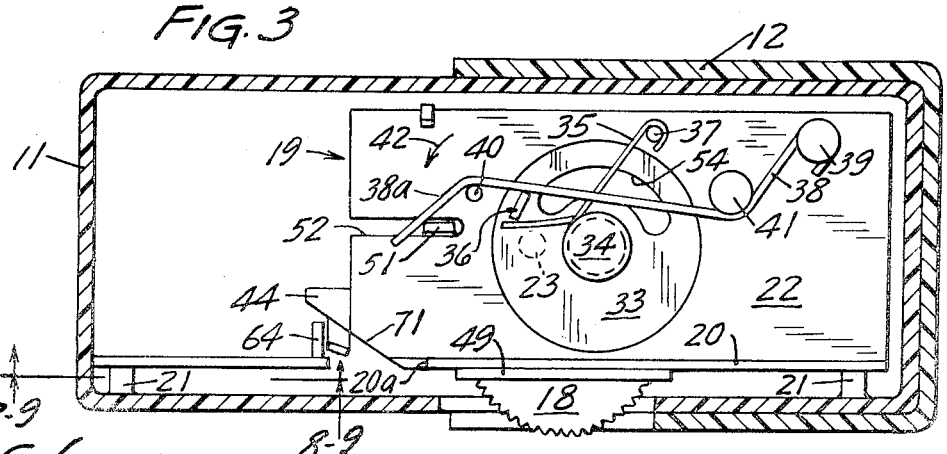
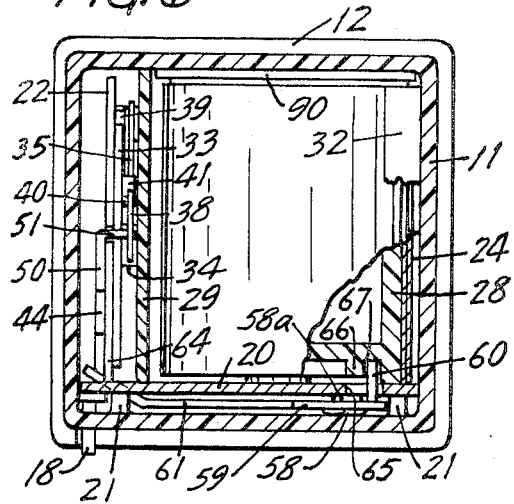
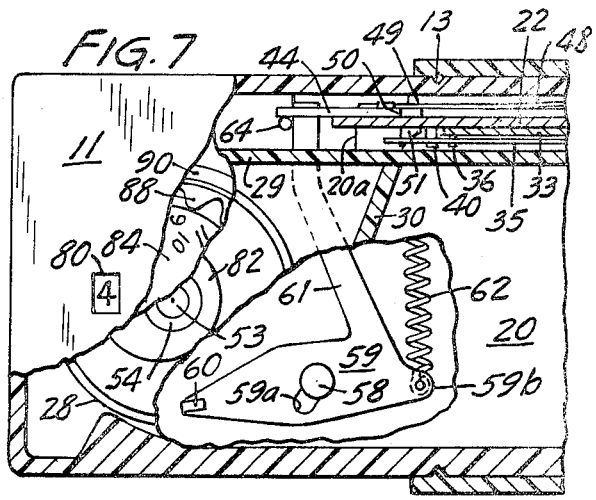
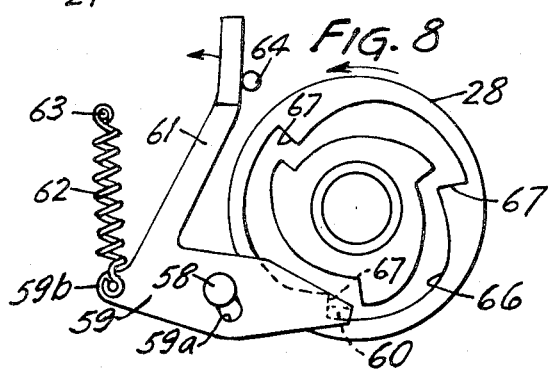
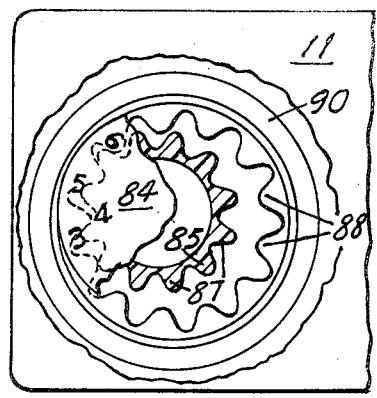
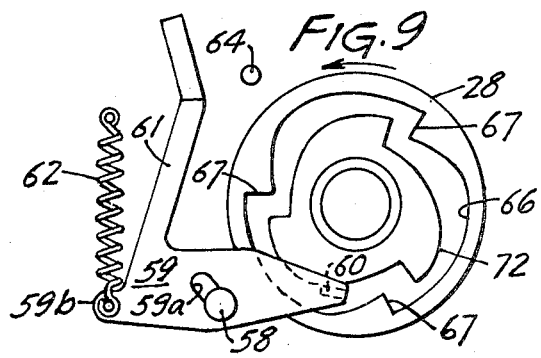
INVENTOR.
PAUL J. GOOD
BY Kinney, Alexander,
Sell, Steldt & DeLaHunt
ATTORNEYS

PATENTED AUG 22 1972 3,685,414

INVENTOR.
PAUL J. GOOD
BY Kinney, Alexander,
Sell, Steldt, & DeLaHunt
ATTORNEYS

SPRING-POWERED PRELOADED CAMERA

BACKGROUND OF THE INVENTION

The present invention grows out of the recent popularity of cameras that are loaded with film cartridge or magazine. These cameras have greatly simplified and increased the popularity of picture-taking for amateur photographers. With most of these cameras, the user simply inserts the cartridge in the camera, operates a shutter-release button to take pictures, and operates a lever to advance film; the advancement of film is automatically metered by a sensing mechanism that registers with perforations in the film. In more expensive varieties, the camera is equipped with a motor that automatically advances film after the shutter-release button is operated; thus the camera user need not operate a lever to advance film.

As a further simplification of amateur photography, it has been suggested to modify the cartridge presently inserted into a camera and add parts that make it a "preloaded" camera. This modification provides a system in which an amateur photographer purchases a preloaded camera, operates it to expose the preloaded film, and sends the camera to a processor; upon development of the film, the photographer is sent his pictures.

Such a system of amateur photography eliminates the investment by the amateur photographer in a camera. The preloaded cameras are intended to be widely available so that even if the photographer owns a more elaborate camera, but is not carrying it, he may simply purchase a preloaded camera and take the pictures he desires. Further, the photographer may have in his possession cameras with different kinds of film—black-and-white, color-negative, and color-positive film, for example—each camera ready to shoot.

A serious disadvantage of the preloaded cameras that have been previously suggested is that they have lacked a satisfactory film-advancement scheme. In a quest for simplicity, some of these cameras have required that the camera user manually advance the film by turning a knob on the camera; the correct amount of film advancement is determined by the conventional method of observing through a window in the camera case a number on a film backing. Such a scheme is at an obvious competitive disadvantage when compared to the cameras that offer automatic film metering.

Most of the suggested preloaded cameras use perforated film and a sensing mechanism similar to that used in the popular cartridge cameras. Unfortunately, such a mechanism enlarges the camera and conflicts with the compactness in size that is a major desirability for preloaded cameras to permit them to be conveniently handled and stored in a pocket or purse.

SUMMARY OF THE INVENTION

The present invention overcomes the above problems with film-advancement, and, in fact, provides a new kind of camera—an inexpensive, compact, preloaded camera in which the user operates only a single actuating button. (The invention also provides a new cartridge having essentially the same structure as the new camera except for the absence of some elements of a camera and the presence of some elements needed in a cartridge; for simplicity the discussion will be principally directed to the camera with a later section directed to the cartridge.) In preferred embodiments, the new camera includes a camera case, which is typically integral and not openable without disassembling or breaking the case. The case has a picture-taking opening defining a picture-taking light path; the light path is normally covered by a shutter means operably by an actuating button on the camera for picture-taking exposure of film in the camera. Unexposed film is stored in the camera case, the major portion of the film being wound in a supply roll and the unwound portion extending in preferred embodiments from the supply roll across the light path to a take-up spool to which the film is attached.

Instead of a conventional take-up spool, the take-up spool in the preferred embodiments of the new camera is biased in the direction of take-up rotation by pretensioned spring drive means. Stop means in the camera normally holds the take-up spool against take-up rotation, with stop-release means actuated by operation of the camera-actuating button temporarily releasing the stop means after picture-taking exposure and permitting rotation of the take-up spool through a limited angle sufficient to advance the film one exposure area; typically, the take-up spool rotates through a fixed angle, and to account for the increased length of film advanced by each turn of the take-up spool, the distance between the exposure areas is slightly increased from exposure area to exposure area in the direction of the trailing part of the film.

It will be recognized that this camera, though quite inexpensive, reduces amateur photography to the most elemental operations: the photographer simply aims the camera and actuates the shutter. Since the film is automatically advanced between shots, pictures may be taken rapidly and without interruption of the photographer's attention. Although the film is automatically advanced, the typical mechanism for sensing the length of film travel is eliminated, the externally operated advance mechanism is eliminated, and the new camera is quite compact—essentially as small as the popular film cartridges.

The use of spring power to advance a film is, of course, not new with the present camera; see, for example, U.S. Pats. Nos. 1,034,870 (issued in 1912), 1,369,753 (1921), 2,591,417 (1952), and 3,237,542 (1966). Further, the advancement of film by a fixed rotation of a take-up spool is not new with the present camera; see, for example, U.S. Pat. No. 2,102,574 (1937).

But none of the teachings in these patents accomplishes what is accomplished by the present invention. None of them provide a camera in which a user's only necessary acts are to aim the camera and actuate the shutter. Obviously, none of them is concerned with a preloaded camera, and none of them suggests the reduction in complexity and improvement in results that may be accomplished with pretensioned, spring drive means in a preloaded camera.

IN THE DRAWINGS,

FIG. 3 is a section along the lines 3—3 in FIG. 2;

FIG. 6 is a section along the lines 6—6 in FIG. 2;

FIG. 7 is a plan view, partially in section, of a part of the camera showing the side not pictured in FIG. 1;

Figure 11:
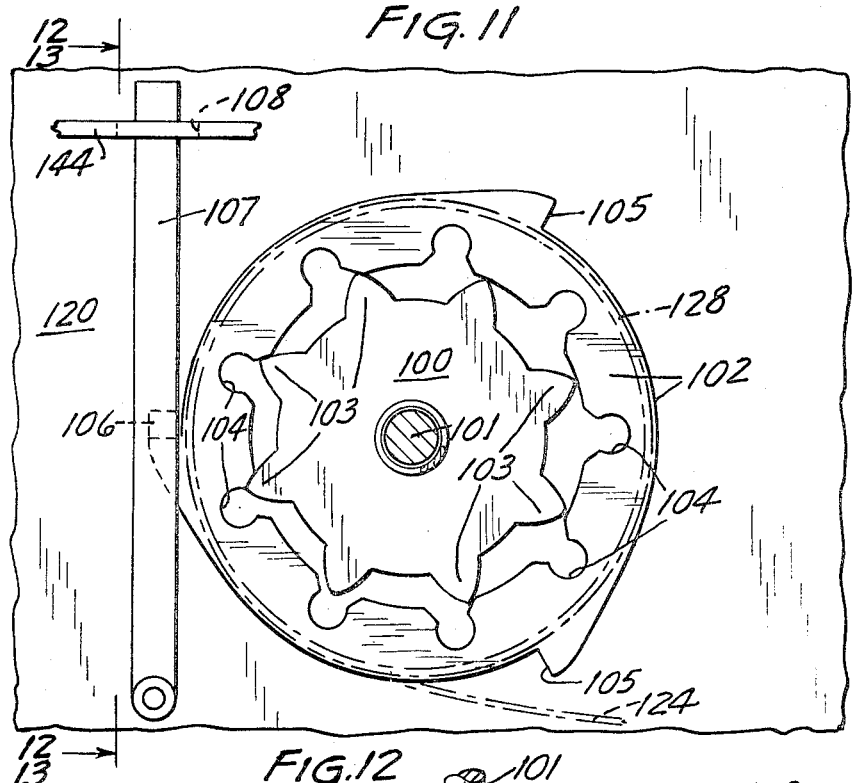
Figure 12:
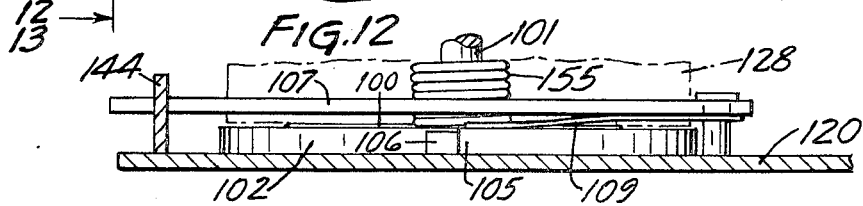
Figure 13:
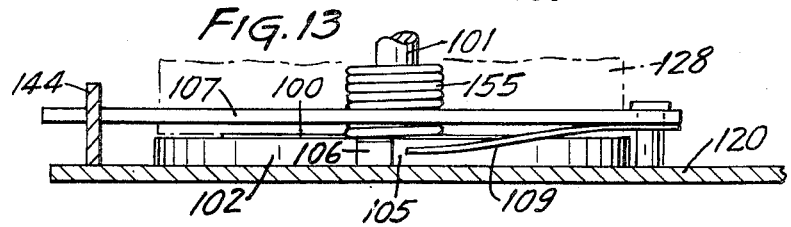

FIGS. 8 and 9 are schematic views of parts of the camera taken generally in the direction of the arrows 8—8 and 9—9 in FIG. 3;

FIG. 10 is a plan view similar to FIG. 7 except different parts of the camera are broken away;

FIG. 11 is a greatly enlarged plan view of a portion of the mechanism of an alternative embodiment of the camera;

FIGS. 12 and 13 are sections along the lines 12—12 and 13—13 in FIG. 11; and

Figure 14:
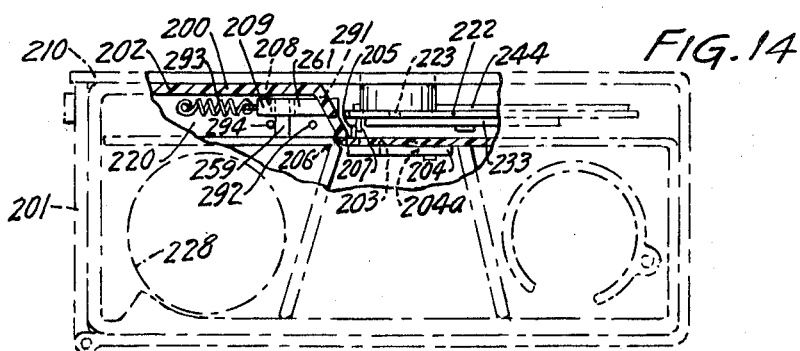

FIG. 14 is a plan view, partially schematic, of a cartridge of this invention inserted in a camera.

DETAILED DESCRIPTION

Figure 1:
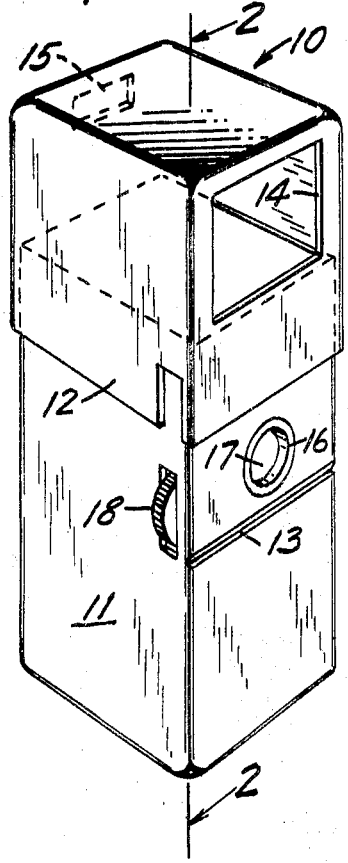
FIG. 1 is a perspective view of a camera of this invention.

As shown in perspective in FIG. 1, an illustrative camera 10 of this invention includes an exterior case 11 and a viewfinder sleeve 12 that is slidable on one end of the case 11. The case 11 is integral, that is, designed not to be opened by a camera user, and is typically formed from two halves that are placed around the interior parts of the camera and then attached, as by adhering them with adhesive, taping them together, or using other typical plastic joining methods. Grooves and detents 13 on the outside of the case and the inside of the sleeve releasably hold the sleeve in either the closed or extended position. The view-finder sleeve includes openings 14 and 15 through which a camera user can view the scene being photographed. A lens mounting 16 holds a lens 17 and extends through the front wall of the camera case 11, and a slidable camera-actuating button 18 extends through one side wall of the case.

Figure 2:
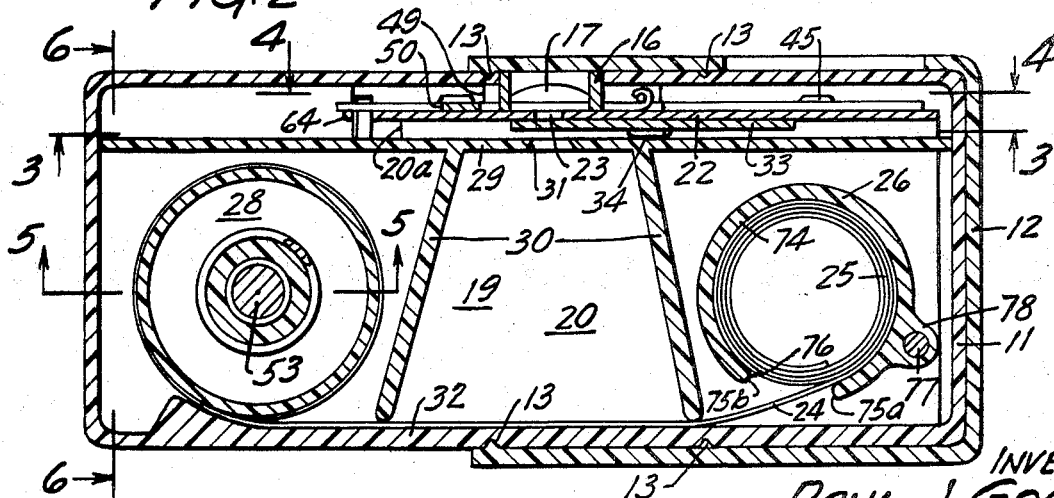
FIG. 2 is a section through the camera taken along the lines 2—2 in FIG. 1, but enlarged over FIG. 1.

FIG. 2 shows a plan view in section of the interior of the illustrative camera 10. The working parts of the camera are mounted on a chassis 19 that is preferably metal and includes a base plate 20 and a front plate 22; the base plate 20 is parallel to the side walls of the camera, and supported on short posts 21 integrally molded with the case 11, and the front plate 22 is parallel to the front wall of the camera. The lens mounting 16 is attached to the front plate 22, as by solder or adhesive depending on whether the lens mounting is metal or plastic, and the front plate 22 has an iris opening 23 immediately in back of the lens 17. Film 24 is preloaded in the camera, with the principal portion stored in a supply roll 25 that in this illustrative camera is inside an open-sided cylindrical enclosure 26. The free end of the film 24 extends from the supply roll to a take-up spool 28 to which it is attached.

An interior front wall 29 and slanted interior side walls 30 are fixed on the base plate 20, as by adhesive, and define film storage and film exposure areas. The picture-taking light path extends through the lens 17 and iris opening 23 and through an aperture 31 in the front wall 29. Only a narrow opening is left between the back wall 32 of the camera and the rear edges of the slanted walls 30 for the film to pass through. The stiffness of the film together with the positioning effect of the rear edges of the slanted walls tend to hold the film against the back wall of the camera where it lies in the focal plane of the lens.

It will be understood that a variety of shutters can be used in a camera of the invention, but in the camera shown, the picture-taking light path is normally blocked by a shutter 33 rotatably mounted on the back of the front plate 22 by a grooved pin 34. As seen in FIG. 3, the shutter 33 is biased in the clockwise direction by a torsion spring 35 wrapped in the groove of the pin 34, with one end of the spring being caught under a projection 36 on the back of the shutter 33 and the other end of the spring being wrapped around a grooved pin 37 fixed to the front plate. The force of the torsion spring 35 is countered by a much stronger wire spring 38, one end of which is wrapped around a grooved pin 39 and the other end of which rests on a grooved pin 40. The wire spring 38 is distorted and placed under tension by being positioned against a third grooved pin 41. This distortion tends to force the turned-down end 38a of the spring in the direction of the arrow 42 in FIG. 3.

Figure 4:
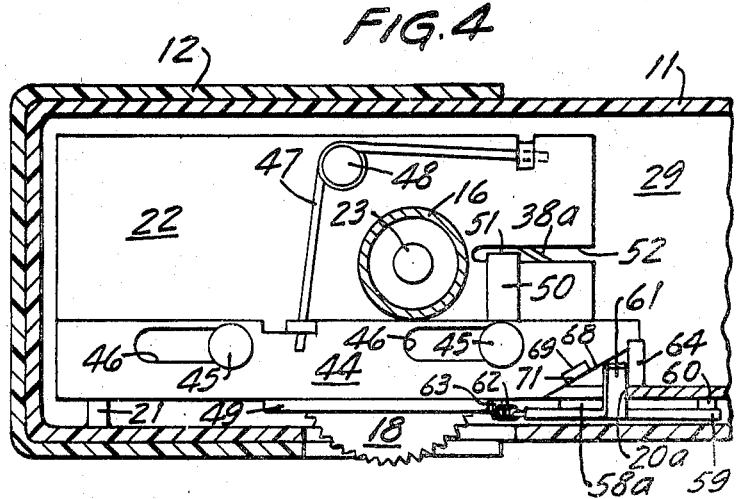
FIG. 4 is a section along the lines 4—4 in FIG. 2.

The shutter 33 is actuated by a slide 44 that is slidably mounted on the front of the front plate 22, as shown in FIG. 4, by retaining studs 45 that lie in elongated slots 46 in the slide. The slide is biased in the rest position shown in FIG. 4 by a torsion spring 47 mounted on a grooved stud 48 fixed to the front plate, the spring having one end held underneath a turned-up portion of the slide and the other end held under a turned-up portion of the front plate. The camera-actuating button 18 is attached to a horizontal flange 49 of the slide, so that when a camera user presses the button, the slide is moved from its rest position to the right in FIG. 4.

The slide 44 includes an arm 50 which has a right-angle tab 51 at one end that extends through a slot 52 in the front plate 22. As the camera-actuating button 18 is pressed and the slide moves to the right in FIG. 4, the tab 51 engages the turned-down end 38a of the wire spring 38 (see FIG. 3) and lifts the end of the spring away from the pin 40. As the slide continues its travel, the tab 51 eventually passes underneath the end 38a of the spring and releases it, whereupon the spring 38 snaps back against the pin 40. During the time that the spring 38 has been lifted off the pin 40, the shutter 33 has rotated in the clockwise direction in FIG. 3 under the urging of spring 35 to move the projection 36 past the normal rest position of the spring 38. The snap return of the wire spring 38, through engagement of the spring with the projection 36, overcomes the force of the spring 35 and sharply rotates the shutter 33. Rotation of the shutter 33 positions an arcuate opening 54 in the shutter over the opening 23 in the front plate. The opening 23 remains uncovered for the predetermined length of time required before the spring 35 overcomes the initial force imparted by the wire spring 38 and rotates the shutter back to rest position.

When the camera user releases the actuating button 18 after having taken a picture, the force of spring 47 causes return of the slide 44 to its rest position shown in FIG. 4. The end of the tab 51 is cut at an angle, as shown in FIG. 7, so that during this returning movement of the slide the tab presses past the end of the wire spring but does not lift it from the pin 40. The groove in the pin 4o is sufficiently wide to permit the spring to slide along the pin but not escape it.

Pretensioned, Spring-driven Take-up Spool

Figure 5:
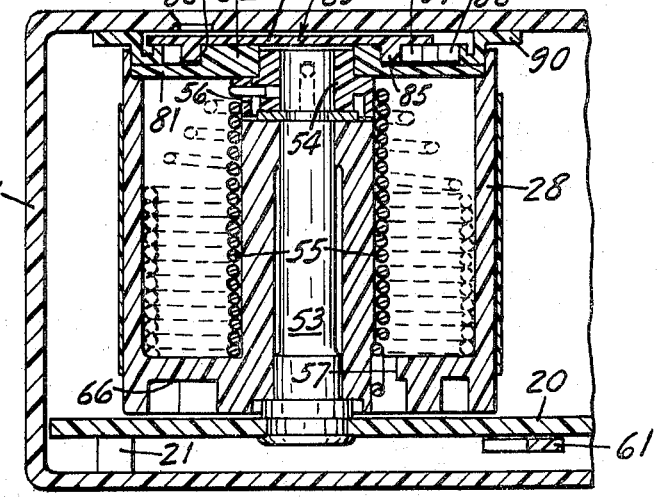
FIG. 5 is a slightly enlarged section along the lines 5—5 in FIG. 2.

The return of the camera-actuating button 18 and the slide 44 to their rest position operates mechanism in this illustrative camera to permit the take-up spool 28 to rotate and draw a new exposure area into the light path. As shown in FIG. 5, the take-up spool 28 is rotatably mounted on a fixed shaft 53 attached to the base plate 20. A cap 54 that is typically molded from plastic is fixed to the top of the shaft 53 and holds the spool 28 in place. The spool body is formed with a large interior annular cavity in which a torsion spring 55, the particular spring-drive means for the camera 10, is contained. As shown in FIG. 5, the top end of the spring 55 is held in an opening 56 in the fixed, nonrotatable cap 54, while the bottom end of the spring is held in an opening 57 in the bottom wall of the spool and rotates with the spool. The spring 55 is in a tensioned condition when the camera is sold, and the spring is shown in this condition in FIG. 5 by solid lines. The spring may be wound from the untensioned condition, in which it is shown in FIG. 5 in dashed lines, by various ways, such as by rotating the spool during the film-loading process in the factory.

Stop means normally holds the spool 28 at rest against the influence of the spring 55, this stop means including a set of stops on the bottom of the spool and a stop lever 59 pivotably attached to the bottom of the base plate 20 as shown in FIGS. 4 and 6 by a shoulder screw 58 that extends through an elongated slot 59a in the stop lever; a washer 58a spaces the lever from the plate. The stop lever, is typically a thin metal stamping and, as shown in FIG. 7, includes a main body portion having an upstanding post 60 on one end and an elongated arm 61 extending from the other end. Most of the arm 61 is coplanar with the body portion of the stop lever, but near its free end, the arm slants upwardly through an opening 20a in the base plate 20 into a position to contact the slide 44. The stop lever 59 is urged in the counterclockwise direction, as viewed in FIG. 7, by a tension spring 62 attached between an ear 59b of the stop lever and a stud 63 mounted on the bottom of the base plate 20. The spring 62 normally holds the lever 59 at rest against a post 64 mounted on the base plate 20.

The post 60 on the end of the stop lever 59 extends upwardly through another opening 65 in the base plate 20, as shown in FIG. 6, into a segmented track 66 recessed in the bottom of the spool. The walls defining the track project sharply inwardly at three locations, as seen in FIGS. 8 and 9, to form stops 67, and in the rest position of the stop lever 59 shown in FIG. 8, the post 60 engages one of the stops 67 and prevents rotation of the spool. The engagement of the post 60 by stop 67 holds the lever 59 so that the screw 58 is against the edge of the slot 59a that is at the top in FIGS. 7–9.

The means for releasing the stop means, that is, for moving the stop lever 59 out of the rest position shown in FIG. 8, includes cooperating parts on the arm 61 of the stop lever and the slide 44. During movement of the slide to the right in FIG. 4 by movement by a camera user of the camera-actuating button 18, an inclined edge 68 of the slide engages the upturned end of the arm 61 of the stop lever, and since the thin metal arm is somewhat flexible, gradually flexes the arm down until it springs into a recess 69 in the slide. Thereupon, the slide 44 will not advance further, since the arm 61 is held by the post 64. As previously noted, when a camera user releases the actuating button 18 after having taken a picture, the slide 44 is retracted under the bias of the spring 47. As the slide is retracted, the stop lever 59 is pivoted in the clockwise direction in FIG. 7, or the counterclockwise direction of FIGS. 8 and 9, and the post 60 disengages the stop 67 of the spool. Thereupon, the spool 28 is free to rotate under the bias of the torsion spring 55 inside the spool.

When the post 60 on the stop lever 59 disengages the stop 67, the spring 62 pulls the lever up in FIGS. 7–9 until the screw 58 rests against the bottom of the slot 59a. This forward movement of the lever causes the slanted arm 61 of the lever to disengage from the recess 69 of the slide. Thereupon the spring 62 returns the stop lever 59 to substantially its original position with the arm 61 against the post 64. In this position the post 60 is in the path of a stop 67 on the rotating spool 28, and when the stop 67 engages the post 60 the spring force driving the spool moves the lever down in FIGS. 7–9 until the screw 58 is against the top of the slot 59a as shown in FIG. 8. It will be seen that one edgewall 72 of the track 66 also forces the post 60 on the stop lever 59 back to its stop position; the edgewall 72 provides a cam surface that can be used to initiate other actions in the camera, as, for example, for certain kinds of shutters, a return of the shutter to the cocked condition.

The parts of the camera that provide actuation of the shutter and movement of the take-up spool are dimensioned so as to prevent double-exposure of a single area of film. That is, when the tab 51 of the slide 44 releases the end of the wire spring 38 to actuate the shutter 33, the recess 69 in the slide 44 at the same time engages the arm 61 of the stop lever. Since the shutter cannot be actuated again until the slide 44 has returned to its rest position, the stop lever must be pivoted out of stop position, and thus the take-up spool will always be rotated one increment between operations of the shutter.

In the embodiment shown, the take-up spool rotates one-third of a rotation during each increment of rotation, which in the camera illustrated, is adequate to advance the film one exposure area. Since the effective wrapping radius of the take-up spool will gradually increase as convolutions of film are wound on the spool, the exposure areas will be spaced slightly further apart on succeeding portions of the film.

While in the camera illustrated, the film 24 is attached to a spring-driven take-up spool 28 and wound in a roll around that spool, other advance means are used in cameras and cartridges of the invention. For example, a toothed wheel that engages perforations in the film and is biased by pretensioned spring drive means is useful in a camera or cartridge of this invention to advance the film from a supply roll to a take-up roll. In such a mechanism, the stop means that holds the wheel against film-advancing movement can either engage stops on the wheel or the perforations in the film. The use of a spring-driven take-up spool as in the camera 10, however, is a most direct and simple apparatus using unperforated film and is preferred.

Enclosure for Supply Roll

The open-sided cylindrical enclosure 26 is uniquely constructed to assist in advancement of the film. These unique features include making the cylindrical wall 74 of the enclosure (1) flexible, as by molding it from a flexible plastic, and (2) free standing and attached to the base plate 21 only near the trailing edge 75a of the two edges 75a and 75b of the wall 74 that define the opening 76 in the enclosure (the film as it leaves the supply roll moves toward the "forward" edge 75b of the wall 74 and away from the "trailing" edge 75a). In the illustrated camera 10, the enclosure 26 is attached to the base plate 20 by a screw 77 extending through a bracket 78 that is integrally molded with the cylindrical wall 74 of the enclosure.

When the film 24 is advanced by rotation of the take-up spool 28, the supply roll 25 turns within the enclosure 26 and film is played out. Should the roll 25 of film at first not turn because of friction with the interior of the cylindrical wall 74, the force drawing the film to the take-up spool will pull the whole roll against the unattached portion of the wall 74 and cause the wall to flex. This flexing will permit a portion of the surface of the supply roll to pull away from the enclosure, thus reducing the frictional force that restricts turning of the roll within the enclosure. The wall 74 will generally continue to flex until the frictional force is lower than the force tending to rotate the roll 25.

Film Counter

In the camera illustrated, a unique counter mechanism presents the number of the exposure area of the film that is ready for shooting in an opening 80 in the camera case 11 (see FIG. 7). This counter mechanism is mounted on the top of the take-up spool 28. As shown in FIG. 5, the spool 28 includes a top plate 81 fixed to the side walls of the spool. On the top of this plate 81 is a cylindrical eccentric projection 82, the axis of the projection being spaced from the axis of the spool. A counter member 83 is mounted over the eccentric projection 82, the counter member including a circular plate 84 and a cylindrical boss 85 on the back of the plate; the eccentric projection 82 fits slidingly in a central recess 86 in the boss 85 so that the counter member 83 is mounted coaxially with the eccentric projection. The periphery of the cylindrical boss 85 of the counter member is formed with gear teeth 87, as shown in FIGS. 5 and 10, which engage with gear teeth 88 formed around the internal cylindrical recess 89 of a ring 90 that is attached to the camera case 11; the ring 90 is located coaxially with the main axis of the spool.

As the spool 28 rotates, the eccentric projection 82 at the top of the spool carries the counter member 83 in a circular path. During this circular travel of the counter member, the gear teeth 87 of the boss engage the gear teeth 88 of the ring causing the counter member to rotate. Numerals are located on the top surface of the counter plate and arranged in order such that for each increment of rotation of the take-up spool the number corresponding to the exposure area ready to be exposed is presented under the opening 80 in the camera case.

Alternative Stop Means

FIGS. 11-13 show a different stop means and stop-release means for a camera or cartridge of this invention. In this embodiment, a spool 128 on which film 124 is wound is fixed to a gear plate 100 that is rotatably mounted on a spindle 101 attached to a base plate 120. A spring 155 biases the spool 128 and the gear plate 100 in the direction of take-up rotation. A stop ring 102 is loosely laid on the base plate 120 and positioned around the gear plate 100. Gear teeth 103 formed on the periphery of the gear plate 100 mesh with recesses 104 formed around the inside of the stop ring 102, but the ring is large enough so that only some gear teeth engage in the recesses and the ring may move in translatory movement with respect to the gear plate. In addition, the gear plate may rotate with respect to the ring, but because some of the gear teeth are always in recesses of the ring the rotation can only be a few degrees. There is one more recess 104 than there are gear teeth 103, so that after the gear plate has rotated with respect to the ring, some of the gear teeth may engage different recesses than they originally engaged. Three stops 105 are formed in the outer periphery of the stop ring 102, and in the normal rest position shown in FIG. 11, one of these to the base plate 120. The gear plate 100 and the spool 128 are kept from take-up rotation by the engagement of some of the gear teeth 103 in the recesses 104 in the ring.

A stop-release lever 107, pivoted to the base plate 120, lies over the engaged stop 105 of the stop ring and the fixed stop 106. The lever extends to a position where it is engaged in a recess 108 of a slide 144 similar to the slide 44 in camera 10 shown in FIGS. 1-10. A leaf spring 109 is attached to the lever 107 and presses against the top of the stop ring. The lever 107 is moved counterclockwise in FIG. 11 by a movement of the slide 144 to the left to actuate the shutter in the camera, and thereupon the leaf spring moves off the ring and flexes down; when the lever 107 is moved clockwise in FIG. 11 by return of the slide to its normal rest position, the edge of the leaf spring engages the edge of the stop ring and moves it to the right in FIG. 11 until the stop 105 disengages the stop 106. Thereupon, the stop ring, gear plate, and spool rotate under the influence of the spring 155 until the next stop 105 on the stop ring engages the fixed stop 106 attached to the base plate; since the ring has been moved close against the gear plate in the area pushed by the lever 107, the ring is in an extended position with respect to the gear plate in the area of the next stop 105 on the ring, and for this reason the next stop 105 travels a path in which it engages the fixed stop 106.

In the illustrated mechanism, the gear plate rotates more than one-third rotation while the stop ring is rotating from one of its three stops to the next. Because each increment of rotation of the spool 128 is more than 120°, it may have a smaller radius than the spool 28 of the camera 10 shown in FIGS. 1-10 (which rotates 120° in each increment of rotation) and still wrap the same length of film as the spool 28. Thus, a camera using the stop means and stop-release means of FIGS. 11-13 may be thinner than the camera 10 to facilitate handling or to permit exterior design differences.

Preloaded Cartridge of the Invention

As previously noted, this invention also contemplates the manufacture of film cartridges for insertion in a camera. FIG. 14 illustrates one embodiment of a cartridge 200 of this invention inserted in a camera 210 through a hinged door 201. Most of the structure is shown schematically in dashed lines, with the cooperating parts of the cartridge and camera shown in solid lines. The camera includes a front plate 222 in which there is an iris opening 223 covered by a shutter 233 that is rotatably mounted on the front plate. A slide 244 is slidably mounted on the front of the plate 222 and is similar to the slide 44 of the camera 10 shown in FIGS. 1–10. The cartridge 200 includes a case 202 in which there is a first opening 203 that is normally covered by a plate 204 that is pivotably attached to the inside of the cartridge and biased to the covering position by a spring (not shown). A pin 205 fixed to the plate 204 extends through a second opening 206 in the cartridge case, and a projection 207 is attached to the front plate 222 of the camera in the path that the pin 205 travels as the cartridge 200 is inserted into the camera. The pin 205 strikes the projection 207 before the cartridge is fully inserted in the camera, and continued insertion of the cartridge causes the plate 204 to be rotated until an opening 204a coincides with the opening 203 in the cartridge case; at this point the uncovered opening 203 is in line with the iris opening 223 in the plate 222.

The cartridge 200 may include a take-up spool 228 like that shown in the camera 10 with stops on the bottom that cooperate with a stop lever 259 attached to the bottom of a base plate 220 in the cartridge. An arm 261 of the lever 259 extends above the plate 220 and is positioned in a recess 208 in a slide 209 mounted on the front wall of the cartridge. One end of the slide 209 extends slidably but tightly through an opening 291 in the cartridge wall, and when the cartridge 200 is fully inserted in the camera 210 the end of the slide 209 is adjacent the end of the slide 244. Many kinds of mechanical or electromechanical connections can be used between the slide 209 and the slide 244, but in the camera and cartridge illustrated a magnetic connection is used. The slides 209 and 244 have permanently magnetized tips (not shown) made from a ferromagnetic material. When the slide 244 is moved to the left in FIG. 14 to trip the shutter 233 (in a manner similar to the tripping of shutter 33), the magnetic tip on the slide 244 contacts the tip on the slide 209 to form a magnetic connection. Then as the slide 244 is withdrawn (under the pressure of a spring not shown), it pulls the slide 209 to the right in FIG. 14 and pivots the lever 259 to release the take-up spool 228 for take-up rotation. When the lever 259 has pivoted sufficiently, it strikes a stop 292 and the resulting restraint on the slide 209 causes the magnetic connection between the two slides 209 and 244 to be broken, whereupon the spring 293 withdraws the slide 209 until the lever reaches its rest position against the stop 294.

What is claimed is:

1. A compact camera preloaded with photographic film that has a series of exposure areas and is automatically advanced between exposures by spring power, comprising (1) an integral camera case formed to inhibit opening by a camera user and having an aperture defining a picture-taking light path; (2) shutter means normally blocking the picture-taking light path and operable by a camera user to cause picture-taking exposure of the film in the case; (3) movable advance means for advancing the film, a portion of the film being wound in a supply roll and the unwound portion extending from the supply roll across the picture-taking light path to a take-up roll; (4) drive means comprising a pretensioned spring contained wholly within the case for biasing the advance means in the direction of film-advancing movement, the camera being formed without user-operated means for tensioning of the spring; (5) releasable stop means normally holding the advance means against film-advancing movement; and (6) stop-release means operable by a camera user to temporarily release the stop means and permit movement of the advance means through a limited distance sufficient to advance the film one exposure area.

2. A compact camera preloaded with photographic film that has a series of exposure areas and is automatically advanced between exposures by spring power, comprising (1) an integral camera case formed to inhibit opening by a camera user and having an aperture defining a picture-taking light path; (2) shutter means normally blocking the picture-taking light path; (3) camera-actuating means operable by a camera user to actuate the shutter means for picture-taking exposure of photographic film in the camera; (4) a take-up spool to which the film is attached, the remaining portion of film extending across the picture-taking light path to a supply roll; (5) drive means comprising a pretensioned spring contained wholly within the case for biasing the take-up spool in the direction of take-up rotation, the camera being formed without user-operated means for tensioning of the spring; (6) releasable stop means normally holding the take-up spool against take-up rotation; and (7) stop-release means connected to the camera-actuating means so as to be actuated by the camera user's operation of the camera-actuating means to temporarily release the stop means and permit rotation of the take-up spool through an angle sufficient to advance the film one exposure area.

3. A camera of claim 2 in which the stop-release means permits rotation of the take-up spool through a fixed predetermined angle, and the distance between exposure areas on the film gradually increases from the initial exposure areas to succeeding exposure areas.

4. A camera of claim 2 including connecting means interconnecting the shutter means and stop-release means so that operation of the shutter means results in temporary release of the stop means.

5. A camera of claim 2 in which the stop means includes at least one stop on the take-up spool and a stop member movable into and out of the path that the stop on the spool traverses as the spool rotates, the stop member being normally in the path of the stop on the spool and normally engaged with the stop so as to hold the spool against rotation.

6. A camera of claim 5 in which the take-up spool includes a recessed track in which the stop member travels, the track being contoured to provide the stop on the take-up spool and including a portion in front of the stop that directs the stop member into engagement with the stop.

7. The camera of claim 2 in which the pretensioned spring drive means is disposed inside the take-up spool.

8. A camera of claim 2 in which the stop means includes (a) a circular toothed gear plate fixed coaxially to one end of the take-up spool and occupying a position adjacent a base plate; (b) a ring that (i) is positioned around the gear plate and rests on the base plate, (ii) has at least one stop on its outer periphery and recesses on the inside of the ring adapted to receive the gear teeth of the gear plate, and (iii) is free to undergo translatory movement with respect to the gear plate without disengaging all of the gear teeth from the recesses; and (c) a fixed stop on the base plate in position to engage the stop on the ring when the portion of the ring carrying the stop is in an extended position where it may undergo translatory movement toward the gear plate; and the stop-release means (a) includes a stop-release lever pivotable over the stop on the ring when the latter is engaged with the fixed stop on the base plate and (b) has means to engage the ring and move it toward the gear plate to free the ring from the fixed stop on the base plate.

9. A camera of claim 8 in which (a) the translatory movement of the ring disengages some of the gear teeth of the gear plate from the recesses of the ring whereupon the gear plate is free to rotate a limited amount with respect to the ring, and (b) the ring has at least one more recess than the gear plate has gear teeth whereby the gear plate may engage in different recesses of the ring when the gear plate has rotated with respect to the ring.

10. A camera of claim 2 in which
   1. the camera actuating means is an actuating button on the exterior of the camera operable by a camera user;
   2. the shutter means includes
      a. normally closed shutter blade means blocking the picture-taking path, and
      b. linking means linking the actuating button to the shutter blade means such that operation of the actuating button momentarily opens the shutter blade means;
   3. the stop means includes
      a. at least one stop on the take-up spool movable with the take-up spool, and
      b. a stop member movable into and out of the path that the stop travels as the take-up spool rotates, the stop member being normally in the path that the stop travels and normally engaged with the stop so as to hold the take-up spool against rotation; and
   4. the stop-release means includes connecting means interconnecting the stop member and linking means such that, immediately after the actuating button has been operated and the shutter blade means opened and closed, the stop member is first moved out of the path of the stop on the take-up spool to disengage the stop and then returned to the path of the stop.

11. A method for making a preloaded camera in which film is automatically advanced between exposures comprising
   A. assembling camera means that comprises
      1. light-path means defining a picture-taking light path;
      2. shutter means normally blocking the picture-taking light path and operable by a camera user to cause picture-taking exposure of photographic film in the light-path;
      3. movable advance means for advancing film from a supply roll across the picture-taking light path to a take-up roll;
      4. spring drive means for biasing the advance means in the direction of film-advancing movement;
      5. releasable stop means for normally holding the advance means against film-advancing movement; and
      6. stop-release means operable by a camera user to temporarily release the stop means and permit movement of the advance means through a limited distance sufficient to advance the film one exposure area;
   B. loading the camera means with photographic film so that a portion of the film is wound in a supply roll and the unwound portion extends from the supply roll across the picture-taking light path to a take-up roll;
   C. pretensioning the spring drive means whereupon the camera is ready for automatic operation by a camera-user; and
   D. enclosing the camera means and film in an integral exterior case that is not to be opened by a camera user and closes the spring drive means against access to, and tensioning of, the spring drive means by a camera-user.

12. A camera comprising (1) a case having an opening defining a picture-taking light path; (2) shutter means normally blocking the picture-taking light path and operable by a camera user for picture-taking exposure of photographic film in the camera; (3) advance means for advancing film from a supply roll located on one side of the picture-taking light path to a take-up roll located on the other side of the picture-taking light path; and (4) a storage enclosure for the supply roll including a side wall that (a) is parallel to the axis of the supply roll, (b) is continuous and extends completely around the storage area except where divided to form a slot through which film from the supply roll passes to the take-up spool, (c) is free-standing and attached to the camera only near the trailing edge of the two edges of the side wall that define the slot, and (d) is made of a flexible material whereby the force withdrawing the film from the enclosure may flex the side wall to relieve frictional forces between the surface of the supply roll and the interior of the enclosure.

13. The camera of claim 12 in which the enclosure comprises a molded plastic free-standing C-shaped wall attached to the camera near one edge at the opening of the C.

* * * * *

UNITED STATES PATENT OFFICE
CERTIFICATE OF CORRECTION

Patent No. 3,685,414          Dated August 22, 1972

Inventor(s) Paul J. Good

It is certified that error appears in the above-identified patent and that said Letters Patent are hereby corrected as shown below:

In column 1, line 5, insert --a-- after "with".

In column 2, line 7, "operably" should be --operable--.

In column 8, line 27, after "these" insert --stops is engaged with a stop 106 fixed--.

Signed and sealed this 3rd day of April 1973.

(SEAL)
Attest:

EDWARD M. FLETCHER, JR.
Attesting Officer

ROBERT GOTTSCHALK
Commissioner of Patents